(12) United States Patent
Hachimaki

(10) Patent No.: US 6,540,818 B2
(45) Date of Patent: Apr. 1, 2003

(54) HOLLOW FIBER MEMBRANE DEHUMIDIFICATION DEVICE

(75) Inventor: Takeshi Hachimaki, Akashi (JP)

(73) Assignee: Nabco, LTD, Kobe (JP)

( * ) Notice: Subject to any disclaimer, the term of this patent is extended or adjusted under 35 U.S.C. 154(b) by 0 days.

(21) Appl. No.: 09/798,023

(22) Filed: Mar. 1, 2001

(65) Prior Publication Data
US 2001/0035092 A1 Nov. 1, 2001

(30) Foreign Application Priority Data
Mar. 1, 2000 (JP) ........................ 2000-060349

(51) Int. Cl.[7] .......................... B01D 53/22; B01D 53/26
(52) U.S. Cl. ...................... 96/8; 95/52; 96/10
(58) Field of Search .................. 95/52; 96/4, 8, 96/10

(56) References Cited

U.S. PATENT DOCUMENTS

| | | | | |
|---|---|---|---|---|
| 3,735,558 A | * | 5/1973 | Skarstrom et al. | 95/52 X |
| 4,583,996 A | * | 4/1986 | Sakata et al. | 95/52 X |
| 4,718,921 A | * | 1/1988 | Makino et al. | 96/8 X |
| 5,067,971 A | * | 11/1991 | Bikson et al. | 96/10 X |
| 5,084,073 A | * | 1/1992 | Prasad | 95/52 |
| 5,108,464 A | * | 4/1992 | Friesen et al. | 95/52 |
| 5,160,514 A | * | 11/1992 | Newbold et al. | 95/52 X |
| 5,259,869 A | * | 11/1993 | Auvil et al. | 95/52 |
| 5,383,956 A | * | 1/1995 | Prasad et al. | 95/52 X |
| 5,411,662 A | * | 5/1995 | Nicolas, Jr. et al. | 96/10 X |
| 5,525,143 A | * | 6/1996 | Morgan et al. | 96/10 X |
| 5,605,564 A | * | 2/1997 | Collins | 95/52 |
| 5,620,500 A | * | 4/1997 | Fukui et al. | 95/52 |
| 5,961,692 A | * | 10/1999 | Collins | 95/52 X |
| 6,004,383 A | * | 12/1999 | Kuhnelt | 96/8 |
| 6,070,339 A | * | 6/2000 | Cunkelman | 95/52 X |
| 6,128,825 A | * | 10/2000 | Cunkelman | 95/52 X |
| 6,156,096 A | * | 12/2000 | Sirkar | 96/8 X |
| 6,296,683 B1 | * | 10/2001 | Koch | 95/52 X |

FOREIGN PATENT DOCUMENTS

| | | | | |
|---|---|---|---|---|
| JP | 01-224011 A | * | 9/1989 | 96/8 |
| JP | 02-083015 A | * | 3/1990 | 95/52 |
| JP | 03-186315 A | * | 8/1991 | 96/8 |

* cited by examiner

Primary Examiner—Robert H. Spitzer
(74) Attorney, Agent, or Firm—James Ray & Associates

(57) ABSTRACT

A hollow fiber membrane dehumidification device with a housing chamber open to atmosphere via a through hole. Hollow fiber membranes are disposed in the housing chamber and cause compressed air entering from one end to flow through and be discharged at the other end as dehumidified air by discharging moisture to the outside housing chamber. A reflux route is provided to permit a portion of the dehumidified air to flow back to the housing chamber as purged air. First and second orifices are provided on the reflux route wherein the second orifice has an opening diameter larger than that of the first orifice.

2 Claims, 4 Drawing Sheets

HOLLOW FIBER MEMBRANE DEHUMIDIFICATION DEVICE

TECHNICAL FIELD TO WHICH THE INVENTION PERTAINS

The present invention relates to a hollow fiber membrane dehumidification device that dehumidifies compressed air by means of hollow fiber membranes.

PRIOR ART

Since the compressed air that is employed for a drive source for all kinds of devices becomes the cause of early corrosion of the devices when it contains a large amount of moisture, ordinarily it is employed as the drive source after it has been dehumidified by a dehumidifier. A freezing type and an adsorption type are generally adopted for this kind of dehumidification device, but in recent years hollow fiber membrane type dehumidification devices have attracted attention based on the facts that they have been miniaturized, made lighter, and had their maintenance operations simplified.

Previously, the above-mentioned hollow fiber membrane dehumidification devices involved as shown in FIG. 4 the positioning of multiple hollow fiber membranes (52) in a housing chamber (53) inside a housing (51), and the sending in of compressed air from one end of these hollow fiber membranes (52), and while this compressed air was caused to flow through the inside the moisture in the compressed air was selectively discharged to the housing chamber (53) owing to the pressure difference between the partial pressure of the water vapor of the compressed air and the partial pressure of the water vapor of the outside housing chamber. Then, after the compressed air has been made into dehumidified air by dehumidifying it in this manner, it is discharged from the other end of the hollow fiber membranes, and made into a drive source by emitting it to the air tank at the rear stage, etc.

In addition, a portion of the dehumidified air that has been discharged is extracted as purged air by an orifice (55), and in addition to its being caused to flow back to the housing chamber (53) through a reflux route (54) the purged air and the water vapor inside the housing chamber (53) is emitted to the atmosphere through a through hole. Then, by maintaining the partial pressure of the water vapor inside the housing chamber (53) in a low state by the reflux of purged air and the emission of water vapor, it has been composed such that it is usually possible to dehumidify compressed air with an excellent dehumidification function.

PROBLEMS THAT THE INVENTION ATTEMPTS TO SOLVE

However, in the above-mentioned prior composition, just as in cases where the inner partitions of the hollow fiber membranes (52) and the housing (51) have been completely rent asunder by changes with the passage of time, when there arises abnormal operations in which a large volume of dehumidified air and high pressure air leak out to the housing chamber (53) by a route other than the reflux route (54), this air is emitted to the atmosphere together with the purged air through the through hole, so the pressure of the dehumidified air declines to a large extent. Therefore, it becomes impossible to emit the dehumidified air to the air tank at the rear stage, etc., at a pressure above that prescribed, so there is the problem that its reliability as a dehumidification device built into an air source system is low.

Therefore, the purpose of the present invention is the provision of a hollow fiber membrane type dehumidification device that can emit dehumidified air towards an air tank at the rear stage, etc. at a pressure above that prescribed even in the event that there arises abnormal operation wherein a large volume of dehumidified air leaks out to the housing chamber (53).

MEANS FOR SOLVING THE PROBLEMS

In order to solve the above-mentioned problems, the invention in claim 1 is a hollow fiber membrane dehumidification device characterized by the fact that it is equipped with (a) a housing chamber that has been opened to the atmosphere through a through hole; (b) a hollow fiber membrane that has been provided in said housing chamber, and that causes the compressed air that is supplied from one end to the inside to flow through, and at the same time discharges said compressed air from the other end as dehumidified air by discharging the moisture in said compressed air to the outside housing chamber; (c) a reflux route that causes a portion of the dehumidified air that has been dehumidified by said hollow fiber membrane to flow back to said housing chamber as purged air; (d) a first orifice provided on said reflux route; and (e) a second orifice that is provided on said reflux route and that possesses an opening diameter that is larger than that of the first orifice.

According to the above-mentioned composition, the majority of the dehumidified air that has been dehumidified by the hollow fiber membranes is sent into the air tank, while a portion of it is caused to flow back to the housing chamber through the medium of the first orifice of the reflux route as purged air, and after it is used for the dehumidification of the compressed air that flows through the hollow fiber membranes in this housing chamber it is emitted to the atmosphere through the medium of the second orifice of the through route.

At this time, since at the time of ordinary operation the second orifice provided on the through route that serves as the emission side from the housing chamber to the atmosphere possesses an opening diameter that is greater than that of the first orifice provided on the reflux route that serves as the supply side to the housing chamber, the volume of purged air emitted towards the housing chamber ends up being greater than the amount that flows in due to reflux. Owing to this, the pressure of the purged air in the housing chamber ends up being a lower pressure than the pressure of the compressed air that flows through the hollow fiber membranes, so the partial pressure of the water vapor inside the hollow fiber membranes becomes higher than the partial pressure of the water vapor of the outside housing chamber, and as a consequence it becomes possible to accumulate pressure with an excellent dehumidification function by sending compressed air into the air tank.

On the other hand, in those cases where there arises abnormal operation in which a large volume of high pressure air and dehumidified air leaks to the housing chamber owing to such reasons as the hollow fiber membranes being completely rent asunder by the changes with the passage of time, etc., the housing chamber is maintained at a pressure above that prescribed. The result of this is that even if high pressure air and dehumidified air has leaked to the housing chamber it is possible to send the dehumidified air reliably to the air tank with the pressure above that prescribed in this housing chamber.

In addition, the invention in claim 2, being the hollow fiber membrane dehumidification device recorded in claim 1, is characterized by the fact that said second orifice ensures that the pressure of the compressed air that is emitted to the rear stage of said dehumidification device is within the specified range when the compressed air supplied to one end of said hollow fiber membrane has flowed directly into said housing chamber without flowing back through said reflux route.

According to the above-mentioned composition, at the times of both normal operation and abnormal operation, it is possible to emit dehumidified air whose pressure is above that prescribed to an air tank reliably within the range of the practical pressure fluctuations of compressed air.

PREFERRED EMBODIMENT OF THE INVENTION

There follows below an explanation of the preferred embodiment of the present invention based on FIG. 1 to FIG. 3.

The hollow fiber membrane type dehumidification device for the embodiment of the present invention is employed by incorporating it into the air source system of such things as railway cars, large automobiles, ships, and other machine equipment. This air source system possesses, in order from the upper stage to the rear stage, as shown in FIG. 1, (a) an air compressor (1) that is a compressor employing the atmosphere as compressed air; (b) an aftercooler (2) that dehumidifies the compressed air by cooling it; (c) a separator (3) that eliminates the water droplets and dust and oil mist in the compressed air; (d) a hollow fiber membrane type dehumidification device (4) that dehumidifies the compressed air and makes it into dehumidified air; and (e) an air tank (not shown in the figure) that accumulates under pressure the dehumidified air; and (f) a check valve (31) that prevents backflow from the air tank.

The above-mentioned hollow fiber membrane dehumidification device possesses, as shown in FIG. 2, a housing (6) composed of a drum part (6a) formed in a cylindrical shape and cover parts (6b, 6c) that seal both end surfaces of this drum part (6a). An air intake opening (6d) and an air exhaust opening (6e) have been formed on both the cover parts (6b, 6c), respectively. Then, the separator (3) in FIG. 1 and the air tank have been respectively connected to the air intake opening (6d) and the air exhaust opening (6e) through the medium of air piping that is not shown in the figure.

On the other hand, a pair of partition elements (7, 7) has been provided in the interior of the drum (6a). Each partition element (7) has been provided on the sides of the covers (6b, 6c), and an edge part has been joined to the entire inner partition wall surface of the drum (6a) in a hermetically sealed state. These partition elements have divided the internal space of the housing (6) into 3 regions, with an air intake chamber (8) formed by the partition element on one side (7) and the cover (6b), an air exhaust chamber (9) formed by the partition element on the other side (7) and the cover (6c), and a housing chamber (10) formed by the two partition elements (7, 7).

Multiple hollow fiber membranes (11) have been provided on the above-mentioned housing chamber (10). When a pressure differential arises in the partial pressure of water vapor between the inside and the outside of the membranes, the hollow fiber membranes (11) possess the function of causing only water vapor to permeate selectively from the high pressure side to the low pressure side. The two end parts of these hollow fiber membranes (11) are being supported in a hermetically sealed state by the partition elements (7, 7), and each end of these hollow fiber membranes (11) has been respectively opened to the air intake opening (8) and the air exhaust opening (9). By this means, the hollow fiber membranes (11) are configured such that the compressed air introduced to the air intake chamber (8) is taken in from the opening of one end and passed through the inside of the membranes, and at the same time it is into dehumidified air by discharging the water vapor to the housing chamber (10), after which this dehumidified air is discharged from the opening on the other end to the air exhaust chamber (9).

The housing chamber (10) on which the above-mentioned hollow fiber membranes (11) have been provided has been linked to the air exhaust chamber (9) through the medium of a reflux route, etc., and has in addition been opened to the atmosphere through the medium of a through hole. The reflux route possesses (a) a reflux hole (6g) formed on the drum (6a); (b) a first orifice buried at the end of the outer partition surface of the reflux hole (6g); and (c) a pipe for reflux (13) of which one end is connected to the first orifice (32) and the other end of which has been connected to the space between the housing (7) and the check valve (31), and it takes in a portion of the dehumidified air emitted from the air exhaust chamber (9) to the air tank of the rear stage and returns it the housing chamber (10) as purged air. As for the installation of the first orifice (32), it is acceptable if this is provided inside the reflux hole (6g) and also acceptable if it is provided on the pipe for reflux (13) on the outside of the reflux hole (6g).

On the other hand, the through route possesses a through hole (6f) formed on the drum (6a) of the housing (6) and a second orifice (33) buried at the end of the outer partition surface of this through hole (6f), and the water vapor and the purged air of the housing chamber (10) are emitted to the atmosphere through the medium of the through hole (6f) and the second orifice (33). As for the installation of the second orifice (33), it is acceptable if this is provided inside the through hole (6f) and also acceptable if it is provided on the outside of the through hole (6f) through the medium of a pipe.

As far as the above-mentioned second orifice (33) is concerned, when the compressed air supplied to one end of the hollow fiber membranes (11) flows directly into the housing chamber (10) without flowing through the reflux route, the opening hole diameter has been set such that it is possible to ensure that the pressure of the compressed air emitted to the rear stage of the dehumidification device (4) is within a specified range.

In other words, the opening diameter of the second orifice (33) has been set at a diameter larger than the opening diameter of the first orifice (32). Owing to this, at the time of normal operation the amount of purged air emitted towards the housing chamber (10) is made greater than the amount that flows in due to reflux, and by making the pressure (the partial pressure of the water vapor) of the purged air of the housing chamber (10) a lower pressure than the pressure (partial pressure of the water vapor) of the compressed air that flows through the hollow fiber membranes (11), it becomes possible to cause the water vapor of the compressed air of the hollow fiber membranes (11) to be discharged to the housing chamber (10) and thus to make it into dehumidified air. In addition, at times of abnormal operation when a large volume of high pressure air and dehumidified air leaks to the housing chamber (10), when the dehumidified air, etc., that has leaked to the housing chamber (10) is emitted to the atmosphere through the medium of the through hole (6f) it becomes possible to prevent an excessive decline of the pressure of the housing chamber (10) and to emit the air reliably to the air tank of the rear stage with a pressure above that specified by limiting the emission amount by the second orifice.

In addition, the opening diameters of the first orifice (32) and the second orifice (33) have been set such that at times of ordinary operation the amount of purged air emitted from the second orifice (33) by way of the first orifice (32) falls with a range of 17~18% relative to the dehumidified air discharged from the other end by causing it to flow through the inside of the hollow fiber membranes (11). Moreover, when all of the compressed air supplied from the air compressor (1) owing to abnormal operation has flowed directly into the housing chamber (10), the opening diameter of the second orifice (33) has been set such that 50% of this supplied compressed air is emitted to the rear stage of the dehumidification device (4). Then, with a first orifice (32) and a second orifice (33) possessing this kind of opening diameter, it becomes possible to send air with a pressure above that prescribed into the air tank reliably within the range of the practical pressure fluctuations of the compressed air, whether the case be a time of normal operation or a time of abnormal operation.

In the above composition, an explanation is provided below of the action of the hollow fiber membrane type dehumidification device (4).

First, as shown in FIG. 1, after the external air has been made into compressed air with a prescribed pressure by the air compressor (1), it is dehumidified to a certain extent by cooling in the aftercooler (2). Then, the compressed air is sent to the separator (3), and after the water droplets, dust and oil mist have been removed in the separator (3) it is sent into the hollow fiber membrane dehumidification device (4).

As shown in FIG. 2, after the compressed air sent into the hollow fiber membrane dehumidification device (4) is introduced into the entire air intake chamber (8), it is taken in from the opening at one end of the hollow fiber membranes (11) supported by the partition elements (7) to the inside of the membranes, and after flowing through this interior it is discharged from the opening at the other end to the air exhaust chamber (9) as dehumidified air. Then, the majority of the dehumidified air discharged to the air exhaust chamber (9) is emitted to the air tank through the medium of the check valve (31), and after it has accumulated in the air tank it is used as a drive source for such things as air brakes, etc. In addition, a portion of the dehumidified air is refluxed as purged air to the housing chamber (10) through the medium of the reflux route (the pipe for reflux (13) and the reflux hole (6g)) while the flow volume is restricted by the first orifice (32), and after it is used for the dehumidification of the compressed air that flows through the hollow fiber membranes (11) in this housing chamber (10), it is emitted to the atmosphere through the medium of the second orifice (33) of the through hole (6f).

At this time, when it is normal operation in which the dehumidified air has not leaked, the second orifice (33) provided on the side for emission from the housing chamber (10) to the atmosphere possesses an opening diameter that is larger than that of the first orifice (32) provided on the side for supply to the housing chamber (10), so the amount of purged air emitted towards the housing chamber (10) is larger than the amount that flows in due to reflux. Owing to this, the pressure of the purged air in the housing chamber (10) becomes a lower pressure than the pressure of the compressed air that flows through the hollow fiber membranes (11), and as shown in FIG. 3 the partial pressure of the water vapor inside the hollow fiber membranes (11) becomes higher than the partial pressure of the water vapor outside (the housing chamber (10)), so the water vapor of the compressed air that flows through the inside ends up permeating the housing chamber (10) on the low pressure side. The result of this is that the water vapor is gradually eliminated from the compressed air as the compressed air flows through the inside of the hollow fiber membranes, and the compressed air becomes sufficiently dried dehumidified air whenever it is discharged to the air exhaust chamber (9).

Next, when something like the complete rending of the hollow fiber membranes (11) and the partition elements occurs due to changes with the passage of time, it becomes a case of abnormal operation in which a large volume of high pressure air and dehumidified air leaks to the housing chamber (10) from the torn part. Then, when it becomes a matter of such abnormal operation, as shown in FIG. 2 the air that has leaked to the housing chamber (10) ends up being emitted into the atmosphere through the medium of the through hole (6f) and the second orifice (33). At this time, the second orifice (33) has restricted the emission amount such that 50% of the compressed air supplied from the air compressor (1) is emitted to the rear stage of the dehumidification device (4). Therefore, the result of the housing chamber (10) being maintained at a pressure above that prescribed is that the high pressure air and the dehumidified air that has been leaked from the torn parts of the hollow fiber membranes (11) and the partition elements (7) to the housing chamber (10) also maintain a pressure above that prescribed, so it is possible to emit the high pressure air and dehumidified air reliably to the air tank with this pressure.

EFFECTS OF THE INVENTION

According to the invention in claim 1 and claim 2, in the event that there occurs abnormal operation wherein a large volume of high pressure air and dehumidified air leak to the housing chamber due to such reasons as the hollow fiber membranes being completely rent asunder due to changes with the passage of time, etc., the emission of air from the housing chamber to the atmosphere is held in check by the second orifice, so the housing chamber is maintained at a pressure above that prescribed. The result of this is that it is possible to send dehumidified air reliably into the air tank with a pressure above that specified in this housing chamber.

This is a summary compositional diagram of a dehumidification system equipped with a hollow fiber membrane type dehumidification device.

FIG. 2

This is a summary compositional diagram of a hollow fiber membrane type dehumidification device.

FIG. 3

This is an explanatory diagram showing the working state of the hollow fiber membranes.

FIG. 4

This is a summary compositional diagram of a dehumidification system equipped with a hollow fiber membrane type dehumidification device, showing an example of the prior art.

EXPLANATION OF THE KEY

1 . . . Air compressor

2 . . . Aftercooler

Figure 1:
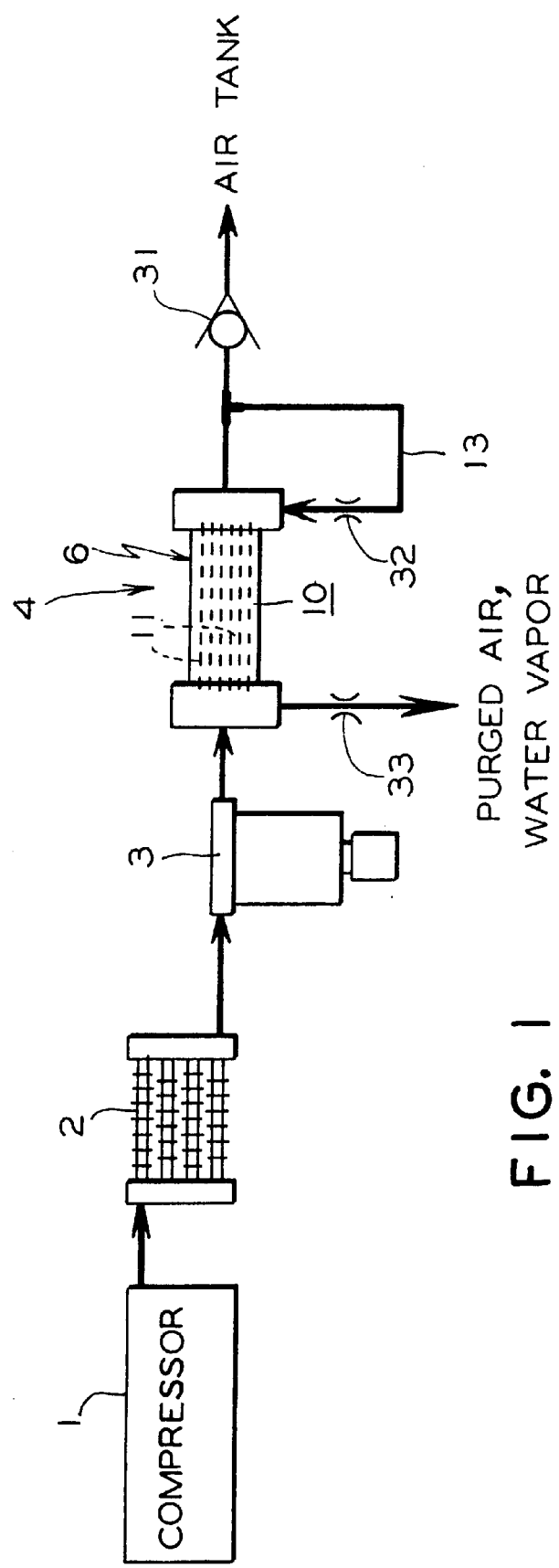
FIG. 1
Figure 2:
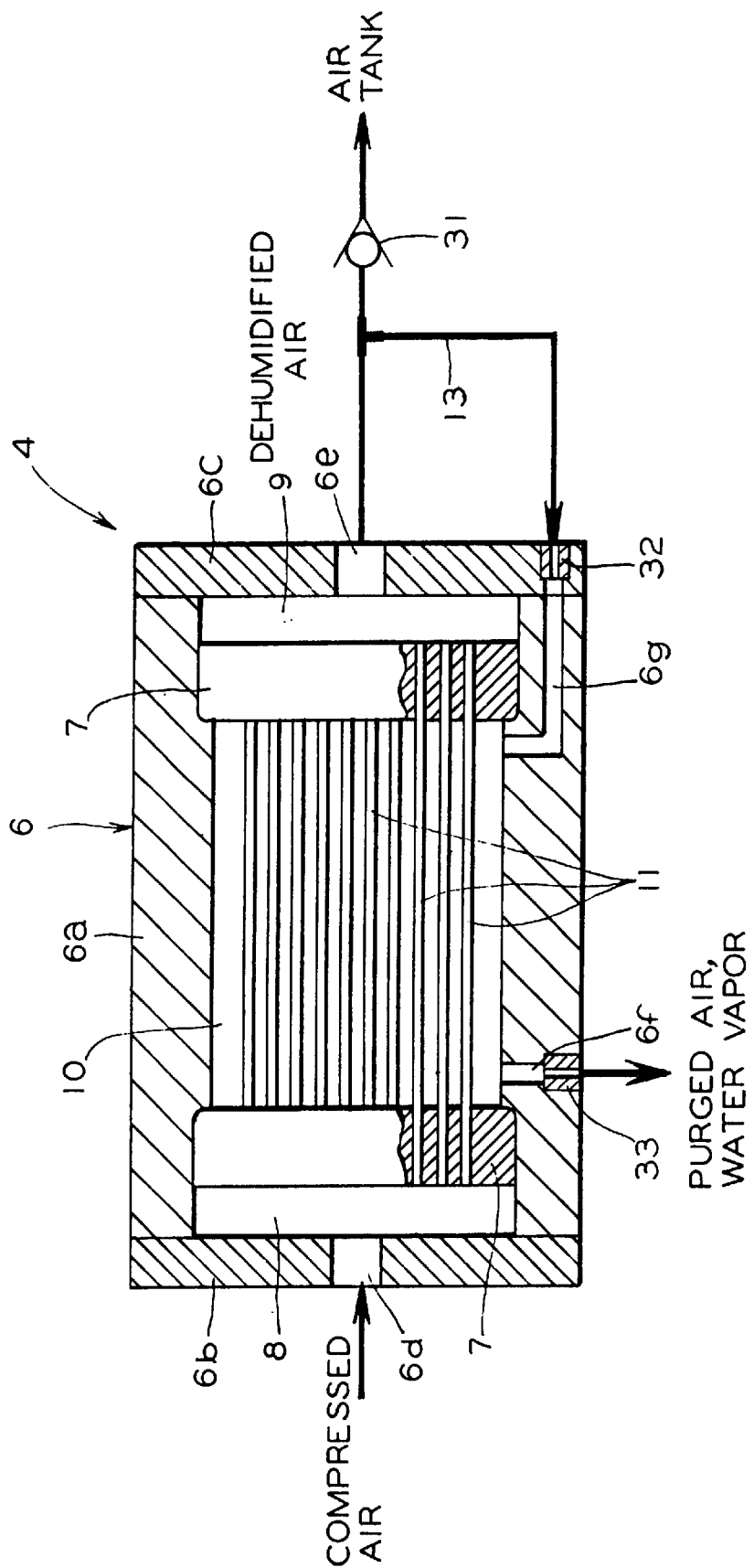
Figure 3:
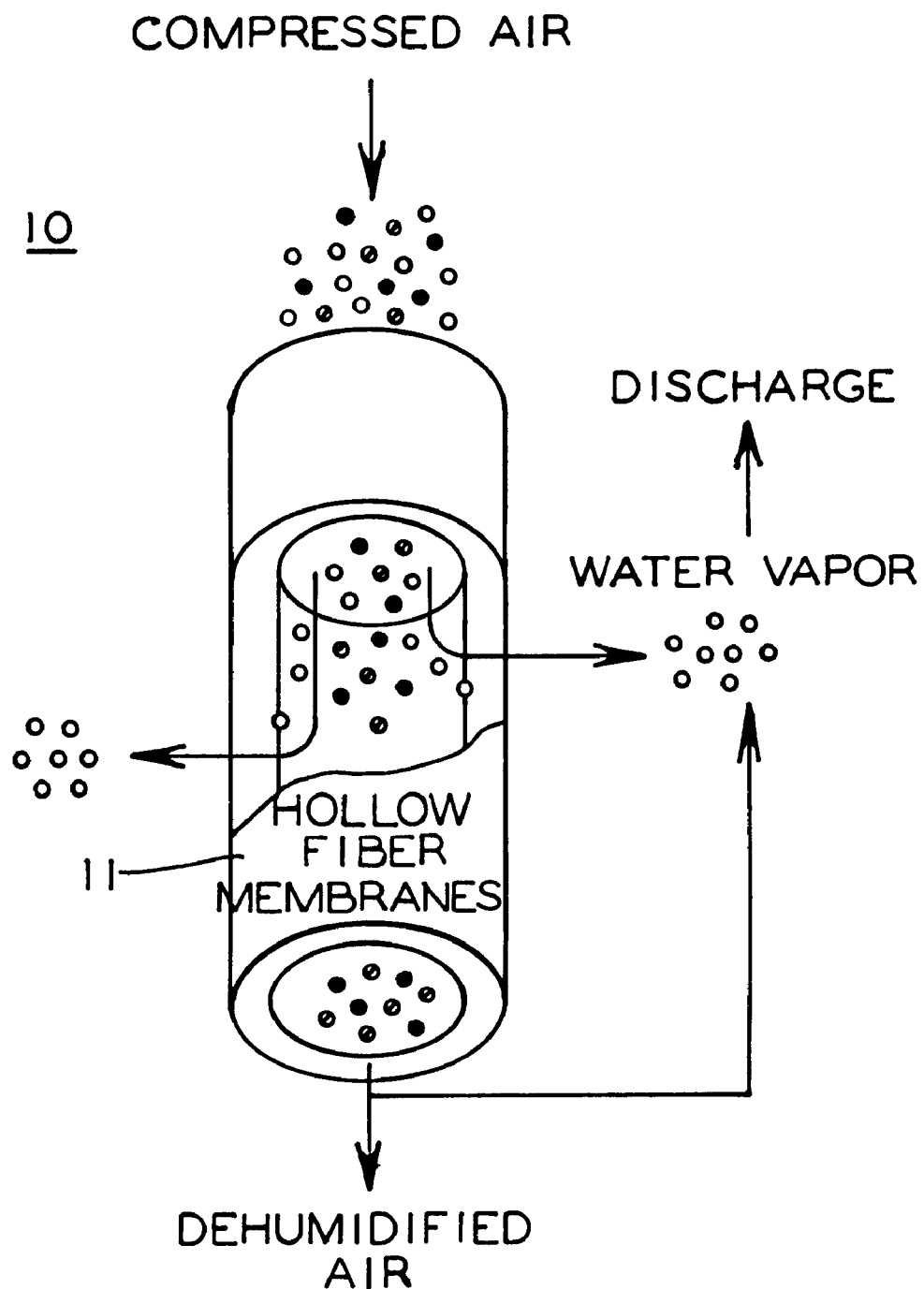
Figure 4:
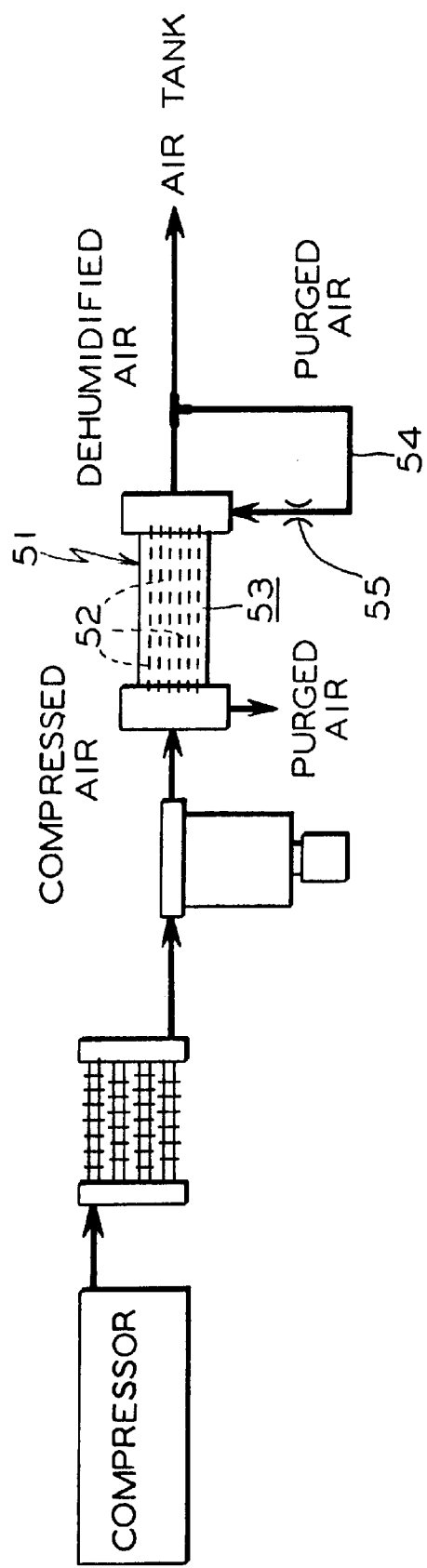

3 ... Separator
4 ... Hollow fiber membrane type dehumidification device
5 ... Air tank
6 ... Housing
6a ... Drum
6b, 6c ... Covers
6d ... Air intake opening
6e ... Air exhaust opening
6f ... Through hole
6g ... Reflux hole
7 ... Partition element
8 ... Air intake chamber
9 ... Air discharge chamber
10 ... Housing chamber
11 ... Hollow fiber membrane
31 ... Check valve
32 ... First orifice
33 ... Second orifice
File Number=00301004
[Document Name] Figures
  [FIG. 1]
  1 ... Air compressor
  [center] Purged air, water vapor
  [arrow leading from 31] Air tank
  [FIG. 2]
  [left] Compressed air
  [center] Purged air, water vapor
  [right] Dehumidified air
  [arrow leading from 31] Air tank
  [FIG. 3]
  [above] Compressed air (moist air)
  [inside cylinder] Hollow fiber membranes
  [below] Dehumidified air
  [right, to bottom]
  Discharge (moist air)
  Water vapor that permeates through
  Purged air (dehumidified air)
  [FIG. 4]
  [left] Air compressor
  [center, above] Compressed air
  [center, below] Purged air
  [arrow leading from 31] Air tank
  [right, above arrow] Dehumidified air
  [right below arrow] Purged air
  [right, end of arrow] Air tank

What is claimed is:

1. A hollow fiber membrane dehuimidification device that is characterized by the fact that it is equipped with (a) a housing chamber that has been opened to the atmosphere through a through hole; (b) hollow fiber membranes that have been provided in said housing chamber, and that cause the compressed air that is supplied from one end to the inside to flow through, and at the same time discharge said compressed air from the other end as dehumidified air by discharging the moisture in said compressed air to the outside housing chamber; (c) a reflux route that causes a portion of the dehumidified air that has been dehumidified by said hollow fiber membrane to flow back to said housing as purged air; (d) a first orifice provided on said reflux route, said first orifice provides sole control of purged air being recycled on said reflux route to said housing chamber; and (e) a second orifice provided downstream of said reflux route possesses an opening diameter larger than that of said first orifice.

2. The hollow fiber membrane dehumidification device of claim 1 that is characterized by the fact that said second orifice ensures that the pressure of the compressed air that is emitted to the rear stage of said dehumidification device is w thin the specified range when the compressed air supplied to one end of said hollow fiber membranes has flowed directly into said housing chamber without flowing back through said reflux route.

* * * * *